US012489485B1

(12) United States Patent
    Moody

(10) Patent No.: US 12,489,485 B1
(45) Date of Patent: *Dec. 2, 2025

(54) CELL PHONE CASE HAVING AN INTERCHANGEABLE BRACELET

(71) Applicant: Brynne M. Moody, Valley City, OH (US)

(72) Inventor: Brynne M. Moody, Valley City, OH (US)

( * ) Notice: Subject to any disclaimer, the term of this patent is extended or adjusted under 35 U.S.C. 154(b) by 351 days.

This patent is subject to a terminal disclaimer.

(21) Appl. No.: 18/092,853

(22) Filed: Jan. 3, 2023

Related U.S. Application Data

(60) Provisional application No. 63/296,457, filed on Jan. 4, 2022.

(51) Int. Cl.
*H04B 1/3827* (2015.01)
*A44C 5/00* (2006.01)
*H04B 1/3888* (2015.01)

(52) U.S. Cl.
CPC ........... *H04B 1/385* (2013.01); *A44C 5/0007* (2013.01); *H04B 1/3888* (2013.01)

(58) Field of Classification Search
CPC ......... H04W 4/80; H04W 4/029; H04W 4/02; H04W 12/06; H04W 84/12; H04W 72/23; H04W 88/06; H04W 4/021; H04W 12/08; H04W 88/02; H04W 24/10; H04W 4/023; H04W 24/02; H04W 24/08; H04W 64/00; H04W 84/18; H04W 72/0453; H04W 48/16; H04W 72/0446; H04W 76/10; H04W 4/12; H04W 4/70; H04W 76/14; H04W 48/18; H04W 4/40; H04W 4/90; H04W 88/08; H04W 4/14; H04W 8/005; H04W 76/27; H04W 76/15; H04W 4/50; H04W 72/21; H04W 16/14; H04W 74/0833; H04W 4/06; H04W 76/11; H04W 12/02; H04W 4/21; H04W 4/027; H04W 4/24; H04W 72/20; H04W 8/18; H04W 84/042; H04W 72/04; H04W 4/16; H04W 4/025; H04W 72/542; H04W 12/069;

(Continued)

(56) References Cited

U.S. PATENT DOCUMENTS 10,441,064 B2    10/2019  Watkins
2003/0213886 A1  11/2003  Gilbert
(Continued)

*Primary Examiner* — Khalid W Shaheed
(74) *Attorney, Agent, or Firm* — The Webb Law Firm

(57) ABSTRACT

The present invention relates to various cell phone cases that are designed to include one or more interchangeable bracelet elements. In one embodiment, the cell phone case of the present invention is comprised of a first element having therein at least one bracelet engaging tab and a second element that together with the first element form a cell phone case designed to hold a cell phone and/or provide protection to a cell phone while simultaneously permitting a user to change between different bracelets (the bracelet elements being designed to be worn around a user's wrist and/or forearm) as desired by said user. In another embodiment, the cell phone case of the present invention is designed to include at least one bracelet engaging tab such that the cell phone case of this embodiment is designed to hold a cell phone and/or provide protection to a cell phone while simultaneously permitting a user to change between different bracelets as desired by said user.

21 Claims, 15 Drawing Sheets

(58) Field of Classification Search
CPC ... H04W 52/0216; H04W 4/38; H04W 88/04; H04W 76/28; H04W 8/26; H04W 48/12; H04W 12/63; H04W 12/04; H04W 48/20; H04W 52/0229; H04W 12/50; H04W 8/22; H04W 64/006; H04W 92/18; H04W 76/19

See application file for complete search history.

(56) References Cited

U.S. PATENT DOCUMENTS

| | | | |
|---|---|---|---|
| 2010/0222118 | A1 | 9/2010 | Interdanato |
| 2012/0031937 | A1 | 2/2012 | Baker |
| 2012/0188693 | A1 | 7/2012 | Chiang et al. |
| 2014/0084034 | A1 | 3/2014 | Wangercyn, Jr. et al. |
| 2014/0299488 | A1 | 10/2014 | Andrew |
| 2014/0364176 | A1 | 12/2014 | Pintor |
| 2015/0181008 | A1* | 6/2015 | Baschnagel ......... H04M 1/0274 455/575.1 |
| 2018/0014630 | A1 | 1/2018 | Watkins |
| 2019/0028584 | A1* | 1/2019 | Duffin ............... H04M 1/72454 |
| 2022/0117384 | A1 | 4/2022 | Whitten |

\* cited by examiner

CELL PHONE CASE HAVING AN INTERCHANGEABLE BRACELET

RELATED APPLICATION DATA

This application claims priority to and is a non-provisional of U.S. Provisional Patent Application No. 63/296,457 filed Jan. 4, 2022 and entitled "Cell Phone Case having an Interchangeable Bracelet," the disclosure of which is hereby incorporated herein by reference in its entirety.

FIELD OF THE INVENTION

The present invention relates to various cell phone cases that are designed to include one or more interchangeable bracelet elements. In one embodiment, the cell phone case of the present invention is comprised of a first element having therein at least one bracelet engaging tab and a second element that together with the first element form a cell phone case designed to hold a cell phone and/or provide protection to a cell phone while simultaneously permitting a user to change between different bracelets (the bracelet elements being designed to be worn around a user's wrist and/or forearm) as desired by said user. In another embodiment, the cell phone case of the present invention is designed to include at least one bracelet engaging tab such that the cell phone case of this embodiment is designed to hold a cell phone and/or provide protection to a cell phone while simultaneously permitting a user to change between different bracelets as desired by said user.

BACKGROUND OF THE INVENTION

Women, as well as some men, almost always have their cell phones on their person. After all, people now use their cell phones for a wide range of functions beyond just making calls. Given this, finding a place to put one's cell phone while out and about presents numerous problems. Women, in particular, have a hard time finding a place to put their cell phone. This is especially true if a woman is not carrying a purse, is working out, or is partaking in some other activity.

While there are numerous activity-related cell phone cases, these cases generally locate one's cell phone on the upper portion of a user's arm, are not fashionably designed, and/or are too bulky for use in connection with everyday non-exercise-related activities.

Thus, there is a need in the art for a cell phone case that is both fashionable (this is especially true for women users) and is easy to wear and use when not partaking in exercise-related and/or sports-related activities.

SUMMARY OF THE INVENTION

The present invention relates to various cell phone cases that are designed to include one or more interchangeable bracelet elements. In one embodiment, the cell phone case of the present invention is comprised of a first element having therein at least one bracelet engaging tab and a second element that together with the first element form a cell phone case designed to hold a cell phone and/or provide protection to a cell phone while simultaneously permitting a user to change between different bracelets (the bracelet elements being designed to be worn around a user's wrist and/or forearm) as desired by said user. In another embodiment, the cell phone case of the present invention is designed to include at least one bracelet engaging tab such that the cell phone case of this embodiment is designed to hold a cell phone and/or provide protection to a cell phone while simultaneously permitting a user to change between different bracelets as desired by said user.

In one embodiment, the present invention relates to a cell phone case comprising: a phone case element having front surface and a back surface, the phone case element having at least one coupling tab affixed to the back surface of the phone case element; and a bracelet element, the bracelet element having therein at least one coupling plate, the coupling plate being designed to couple to, or engage with, at least a portion of the at least one coupling tab of the phone case element, wherein the at least one coupling tab and the bracelet element's coupling plate can be coupled to, or engaged with, one another in order to removably capture only a partial portion of the bracelet element.

In another embodiment, the present invention relates to a cell phone case comprising: a phone case element having front surface and a back surface, the phone case element having integrally formed therein at least one coupling tab; and a bracelet element, the bracelet element having therein at least one coupling plate, the coupling plate being designed to couple to, or engage with, at least a portion of the at least one integrally formed coupling tab of the phone case element, wherein the at least one coupling tab and the bracelet element's coupling plate can be coupled to, or engaged with, one another in order to removably capture only a partial portion of the bracelet element.

In still another embodiment, the present invention relates to a cell phone case comprising: a phone case element having front surface and a back surface, the phone case element having a first portion of a twist-and-lock coupling hub affixed to the back surface of the phone case element; and a bracelet element, the bracelet element having therein a second portion of a twist-and-lock coupling hub, wherein the first and second portions of the twist-and-lock coupling hub are able to be twisted together to removably lock the phone case element to the bracelet element.

In still another embodiment, the present invention relates to a wearable cell phone cradle comprising: a U-shaped element, the U-shaped element designed to span the width of a cell phone, or a cell phone located in any cell phone case, and to removably engage a portion of each of the opposite vertical edges of the cell phone or any cell phone case, the U-shaped element having a front surface and a back surface, the back surface having at least one coupling device; and a bracelet element, the bracelet element having therein at least one coupling device, wherein U-shaped element's coupling device and the bracelet element's coupling device are able to removably engage with one another to permit the repeatable and removable coupling of the U-shaped element to the bracelet element.

DETAILED DESCRIPTION OF THE INVENTION AND THE FIGURES

The present invention relates to various cell phone cases that are designed to include one or more interchangeable bracelet elements. In one embodiment, the cell phone case of the present invention is comprised of a first element having therein at least one bracelet engaging tab and a second element that together with the first element form a cell phone case designed to hold a cell phone and/or provide protection to a cell phone while simultaneously permitting a user to change between different bracelets (the bracelet elements being designed to be worn around a user's wrist and/or forearm) as desired by said user. In another embodiment, the cell phone case of the present invention is designed to include at least one bracelet engaging tab such that the cell phone case of this embodiment is designed to hold a cell phone and/or provide protection to a cell phone while simultaneously permitting a user to change between different bracelets as desired by said user.

It should be noted that in the attached Figures, views are referred to based on the location of the front, back and/or sides of a cell phone that would be inserted into the case of the present invention.

It should be further noted, although the cell phone case of the present invention is depicted as having two elements that engage one another to form a finished complete bracelet engaging cell phone case, the present invention is not limited solely thereto. Rather, the present invention could be formed in one single piece where the bracelet engaging tab described below is located in the appropriate spot on the back of the second element of the cell phone case of FIG. 4. In this embodiment, the present invention would be limited to one overall cell phone case piece that would include therein the bracelet engaging tab described below and would not need to be put together using the first and second cell phone case elements described below.

Figure 1:
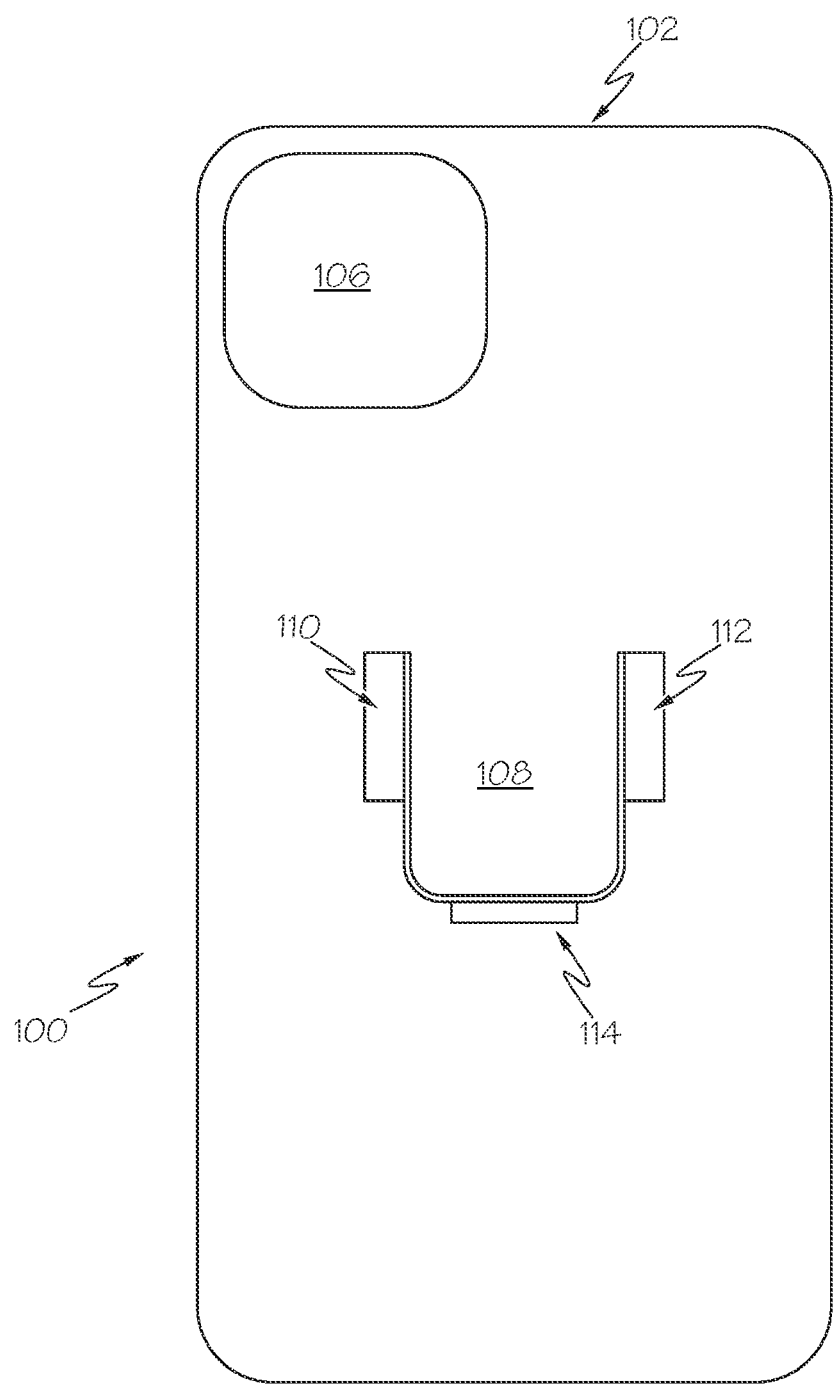
FIG. 1 is a back view of a first element of a cell phone case according to one embodiment of the present invention.
Figure 2:
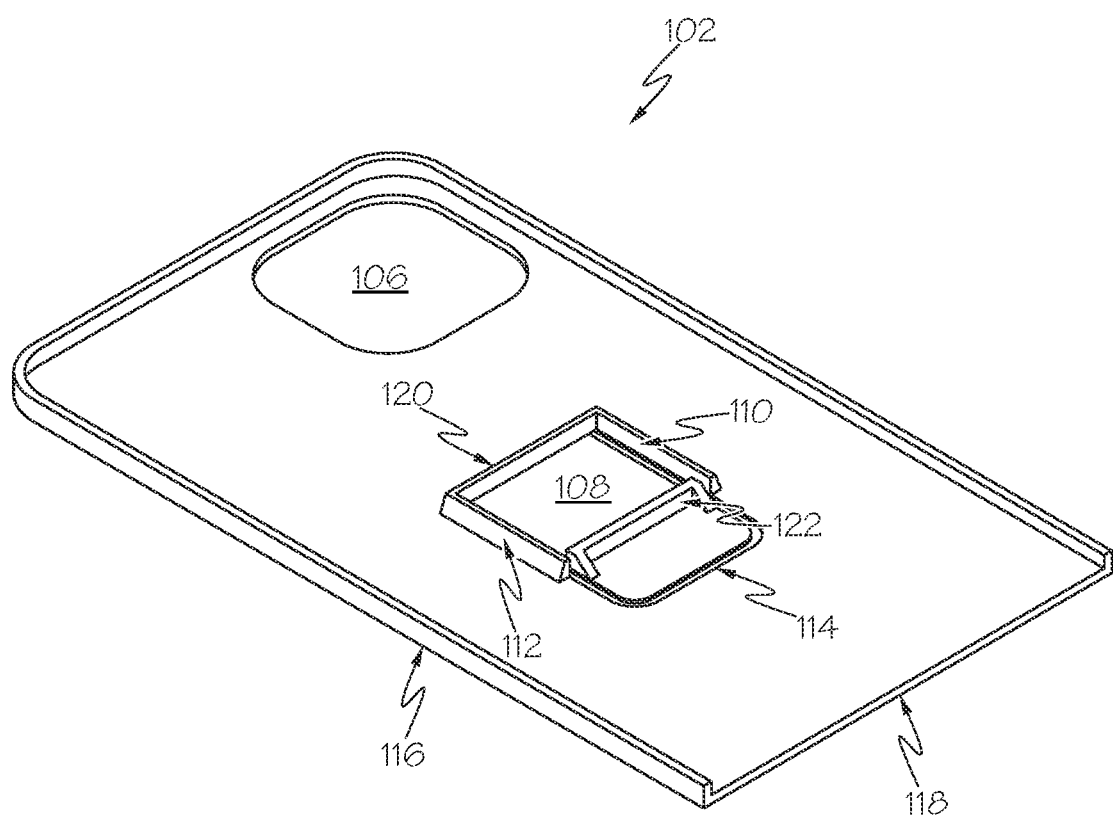
FIG. 2 is a front view of the first element of the cell phone case of FIG. 1.
Figure 3:
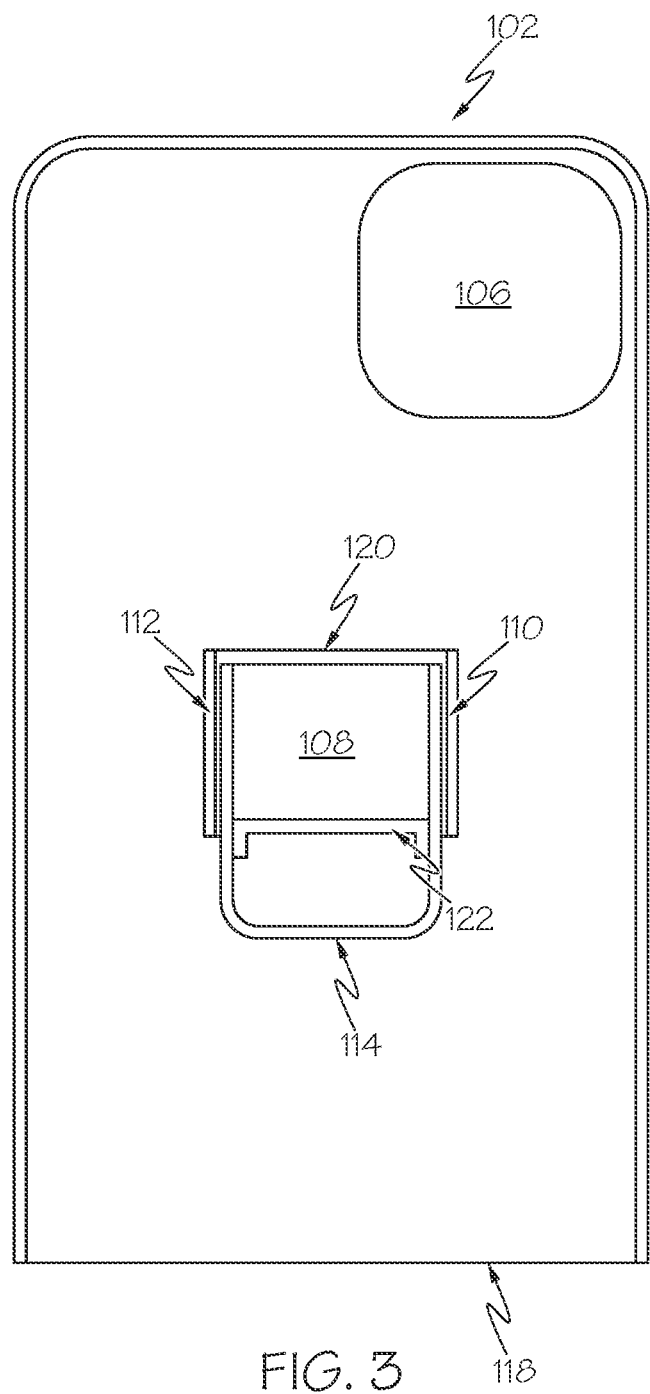
FIG. 3 is another front view of the first element of the cell phone case of FIG. 1.

Turning to FIGS. 1 through 3, as depicted therein these Figures depict a first element 102 of a cell phone case 100 (formed from first element 102 and second element 104 described below—see FIG. 5 for example as to how cell phone case 100 is formed in one instance), according to one embodiment of the present invention. In this embodiment, first element 102 is comprised of a suitably sized camera opening 106, bracelet engaging tab 108, left bracelet engaging opening 110, right bracelet engaging opening 112, and bottom bracelet engaging opening 114. Openings 110, 112, and 114 are located next to bracelet engaging tab 108 and are slanted from the back of first element 102 to the front of first element 102 (see FIG. 2). As can be seen from FIGS. 6 and 7, slanted openings 110 and 112 are deeper than slanted element 114 so as the help form the U-shaped retaining ridge that will be described in relation to FIGS. 3 and 7. Additionally, first element 102 has a beveled edge 116 (see FIG. 2) on three sides of first element 102 such that edge 116 is formed so as to properly engage second element 104. The bottom edge of first element 102 is a flat edge 118 that is also designed to properly engage second element 104 so as to form cell phone case 100.

Figure 7:
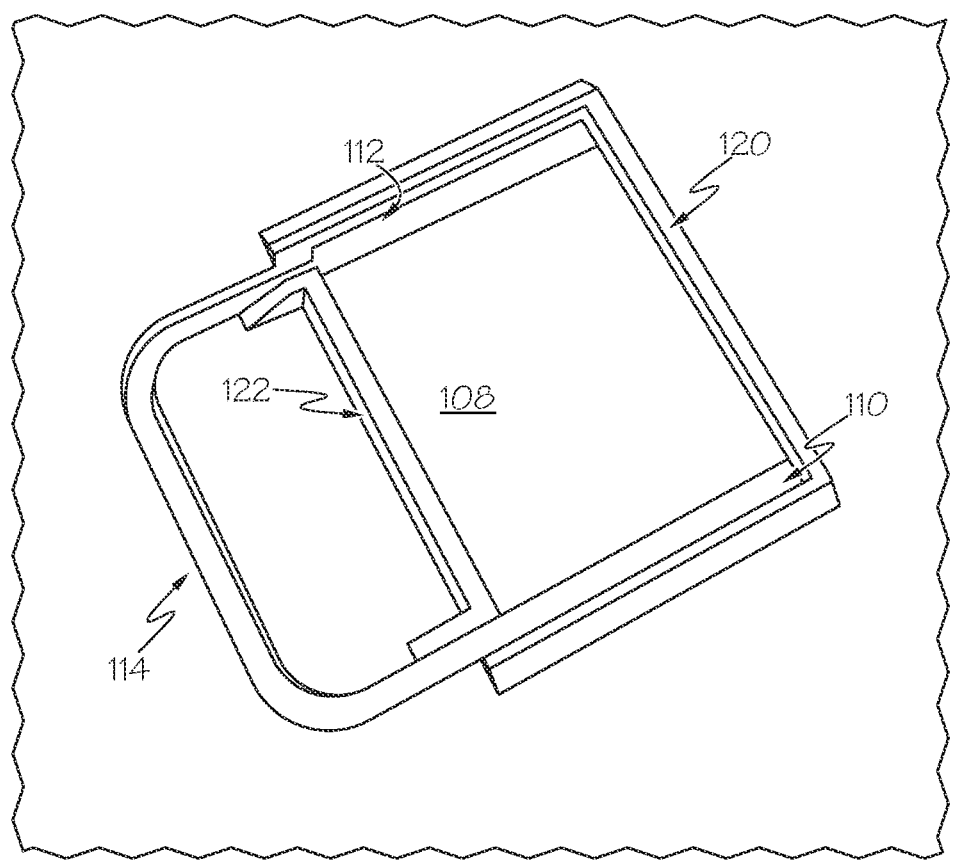
FIG. 7 is a close up front view of the first element of the cell phone case of FIGS. 1, 2 and 3 depicting the bracelet engaging tab of one embodiment of the present invention.

As can be seen in FIGS. 2 and 3, first element 102 of cell phone case 100 has a first bracelet engaging raised U-shaped ridge 120 that is located on the top side of first element 102 next to openings 110 and 112 as well as across the top of tab 108 so as to form aforementioned U-shaped ridge 120. In one embodiment, ridge 120 is slanted as shown in FIG. 7. However, it should be noted that the present invention is not limited to only a slanted ridge 120. Rather, a non-slanted ridge 120 could be used as well.

As can be seen further in FIGS. 2 and 3, first element 102 of cell phone case 100 has a second bracelet engaging raised U-shaped ridge 122 that is located on the top side of first element 102 on a bottom portion of tab 108. In one embodiment, ridge 122 is slanted as shown in FIG. 7. However, it should be noted that the present invention is not limited to only a slanted ridge 122. Rather, a non-slanted ridge 122 could be used as well.

Figure 4:
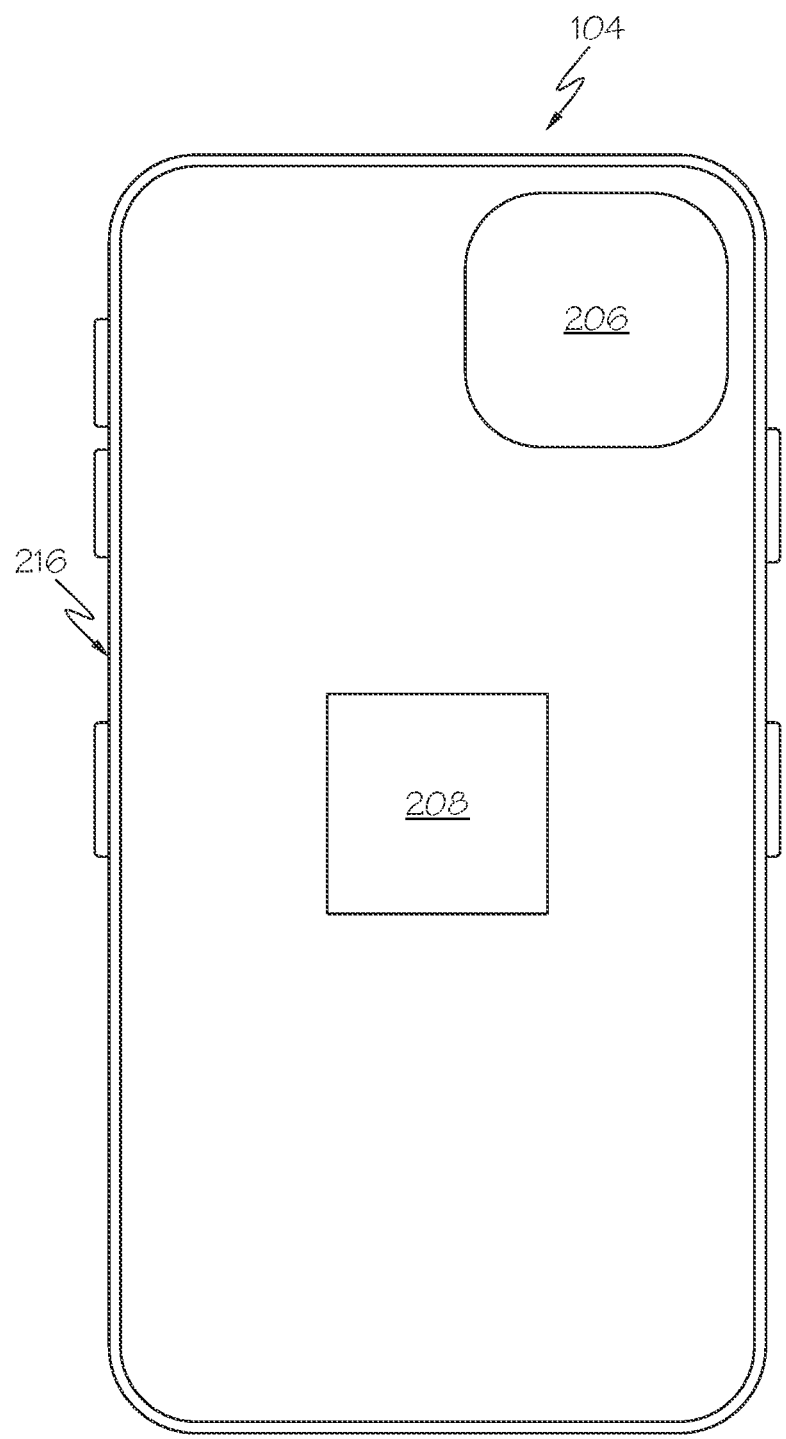
FIG. 4 is a front view of a second element of the cell phone case according to one embodiment of the present invention.
Figure 8:
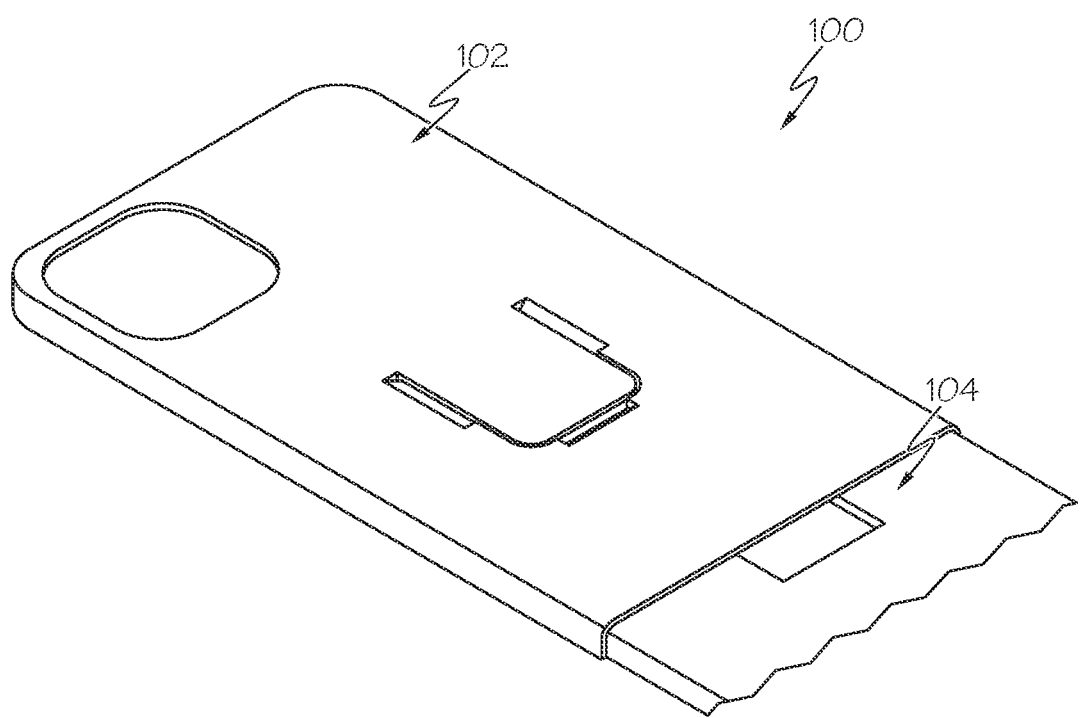
FIG. 8 is a back view of how the first and second elements of the cell phone case of the present invention are coupled together to form a complete cell phone case of one embodiment of the present invention.

Turning to FIG. 4, FIG. 4 depicts second element 104 that together with first element 102 form cell phone case 100 (shown partially assembled in FIG. 8). As can be seen from FIG. 4, second element 104 has a suitably sized camera opening 206 that corresponds to camera opening 106 in element 102, a tab opening 208 that permits a portion of tab 108 show thru second element 104, and a raised beveled edge 216 around all four edges of second element 104. Also included in second element 104 are any necessary volume buttons, mute button openings, power button openings, etc. so as to permit a cell phone placed in the case of the present invention to function as intended.

Figure 5:
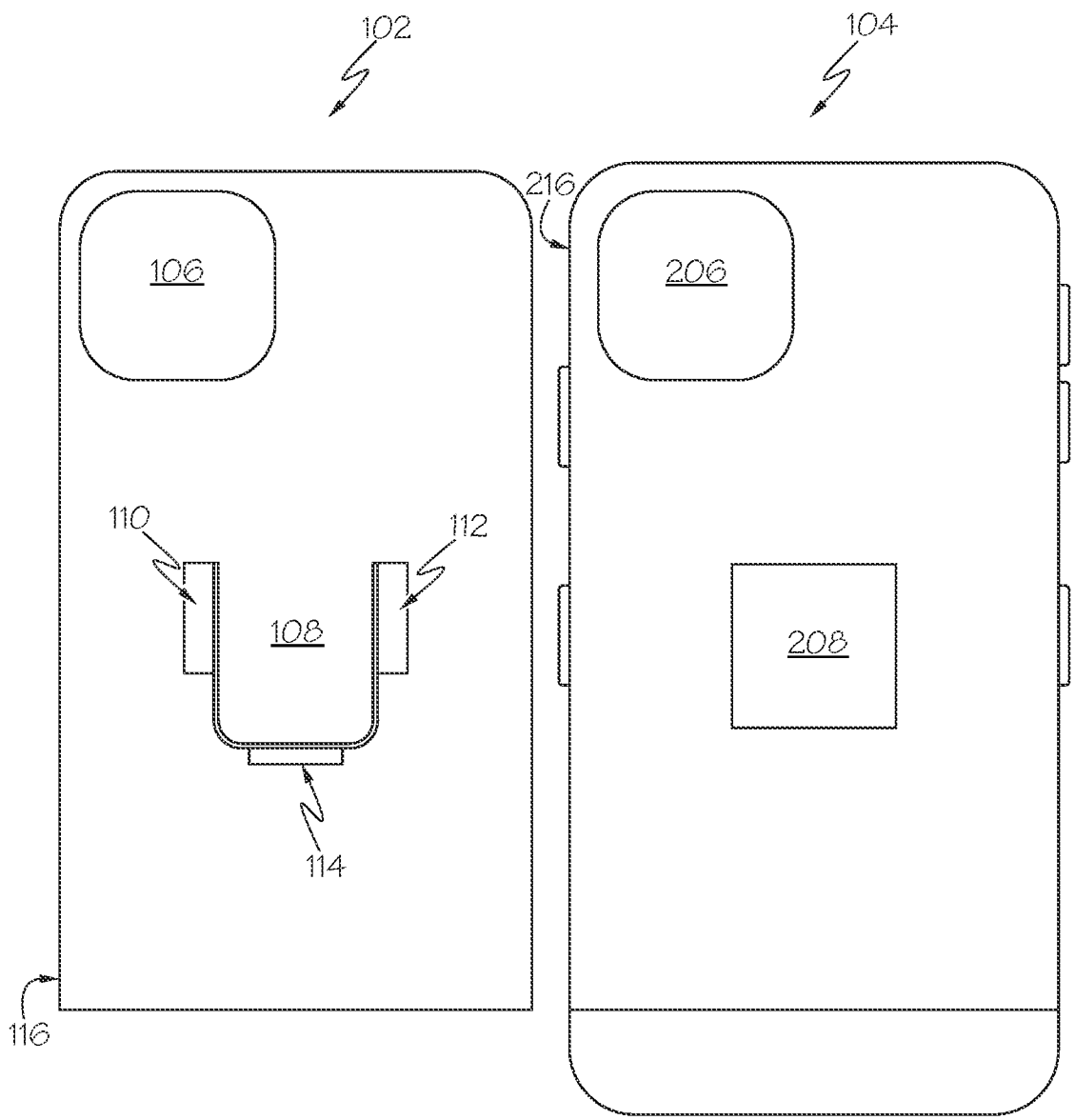
FIG. 5 is a back view of both the first and second elements of the cell phone case according to one embodiment of the present invention.
Figure 6:
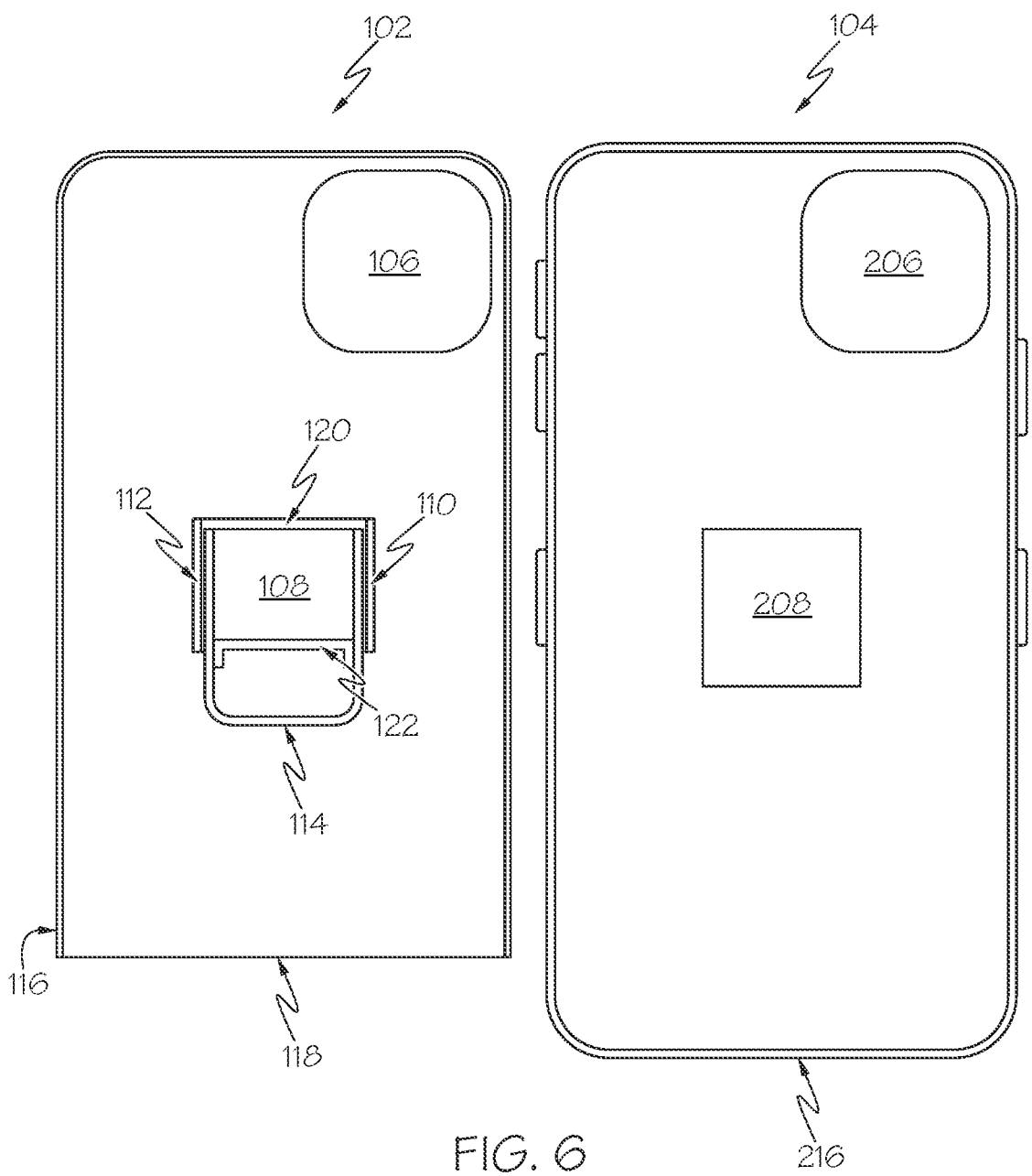
FIG. 6 is a front view of both the first and second elements of the cell phone case according to one embodiment of the present invention.

FIGS. 5 and 6 depict elements 102 and 104 next to and disengaged from one another, while FIG. 8 depicts elements 102 and 104 in partial engagement so as to form cell phone case 100 of the present invention. As noted above, the present invention is not limited to an embodiment where two elements are utilized to form cell phone case 100. Instead the necessary tab features of element 102 could be formed in element 104 so as to reduce the present invention to just one element and eliminate the need to couple together elements 102 and 104 to form case 100.

Given the above, one advantage of the present invention is that it permits a user to change a bracelet element 350 associated with cell phone case 100 of the present invention. This in turn permits a user to mix and match cell phone case 100 with different bracelet elements 350 of the cell phone case of the present invention. The present invention also creates the possibility that third parties could chose to design and market bracelet elements that would be designed to work with the remaining elements of the present invention.

Figure 9:
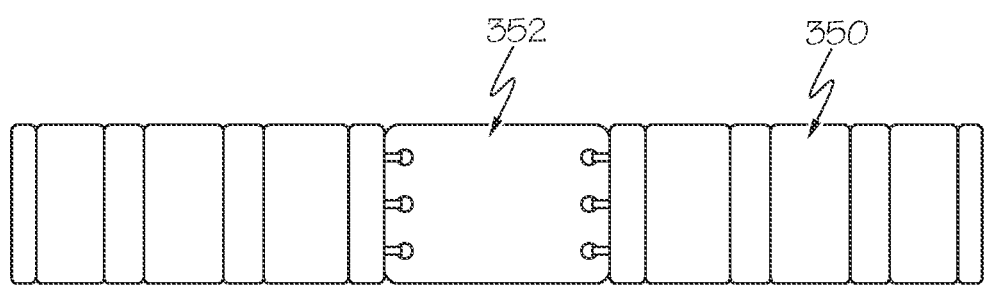
FIG. 9 is a view of a portion of a bracelet that works with the cell phone case of the present invention including a view of the coupling plate that engages an appropriate portion of the cell phone case of the present invention.
Figure 10:
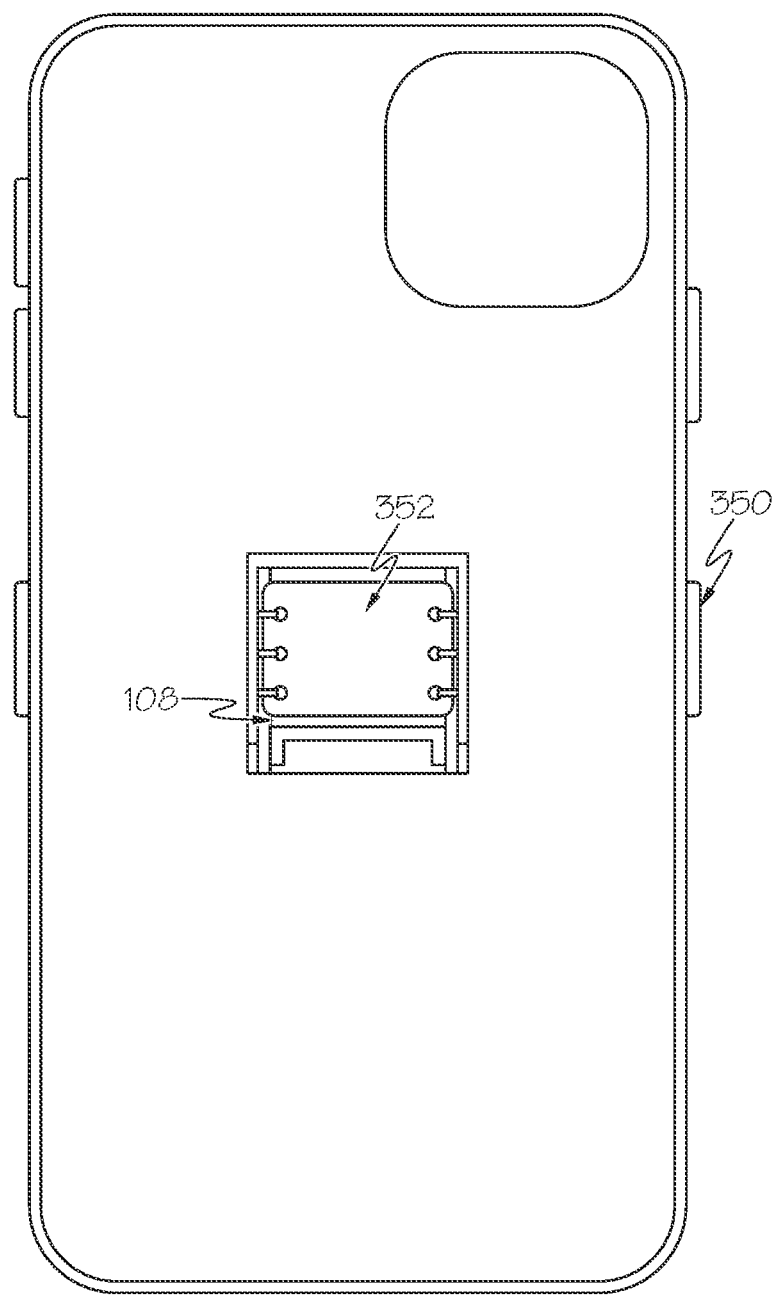
FIG. 10 is a view of a portion of a bracelet (just slightly peeking out on both the middle left and right sides of the cell phone case) engaged with the cell phone case of the present invention.
Figure 11:
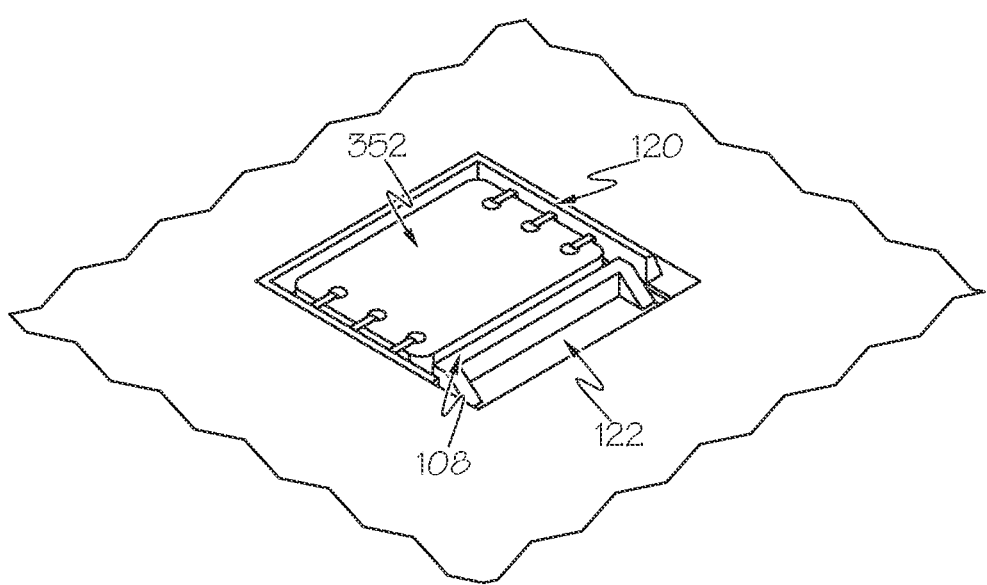
FIG. 11 is another view of a portion of a bracelet engaged with the cell phone case of the present invention.
Figure 12:
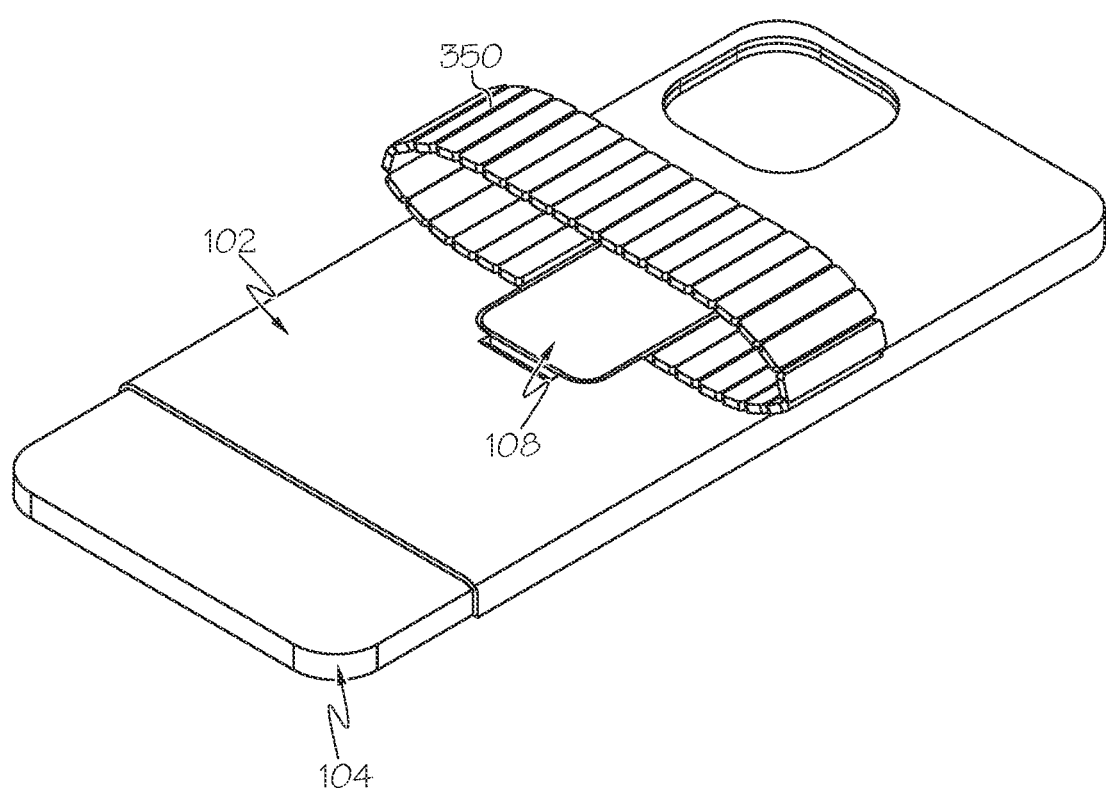
FIG. 12 is a back view of the cell phone case of the present invention where both elements of the cell phone case are coupled together along with a bracelet element also coupled thereto.

Given the above, turning to FIG. 9 this figure is a view of a portion of a bracelet 350 that works with cell phone case 100 of the present invention including a view of coupling plate 352 that engages an appropriate portion of cell phone case 100 of the present invention. In one embodiment, coupling plate 352 is placed in an appropriate location on bracelet 350 as shown in FIG. 9. As can be seen in FIGS. 10 and 11, FIG. 10 is a view of a portion of bracelet 350 (just slightly peeking out on both the middle left and right sides of the cell phone case) engaged with cell phone case 100 of the present invention via coupling plate 352 that engages both first bracelet engaging raised U-shaped ridge 120 (located adjacent tab 108) and second bracelet engaging raised U-shaped ridge 122 (located on bottom portion of tab 108). As can be seen from FIG. 11, FIG. 11 is another close-up of a portion of bracelet 350 engaged with cell phone case 100 (both elements of the cell phone case of the present invention being coupled together) of the present invention via coupling plate 352 that engages both first bracelet engaging raised U-shaped ridge 120 (located adjacent tab 108) and second bracelet engaging raised U-shaped ridge 122 (located on bottom portion of tab 108). Turning to FIG. 12, FIG. 12 is a back view of the cell phone case of the present invention where both elements 102 and 104 of cell phone case 100 are coupled together along with bracelet 350 coupled thereto via coupling plate 352 (not shown). It should be noted that in FIG. 12, element 102 is formed from a white polymer material and not from the same black material as in some of the other Figures discussed herein.

As would be apparent to those of skill in the art, the color of the various elements of the present invention are subjective and have, in one embodiment, no bearing on the functionality thereof. As such, within reason as suitable color scheme can be utilized for the various elements of the present invention. As for bracelet 350, the beads and construction thereof minus coupling plate 352 are totally subjective and can be altered in any number of ways to suit various aesthetic tastes and/or styles.

Figure 13:
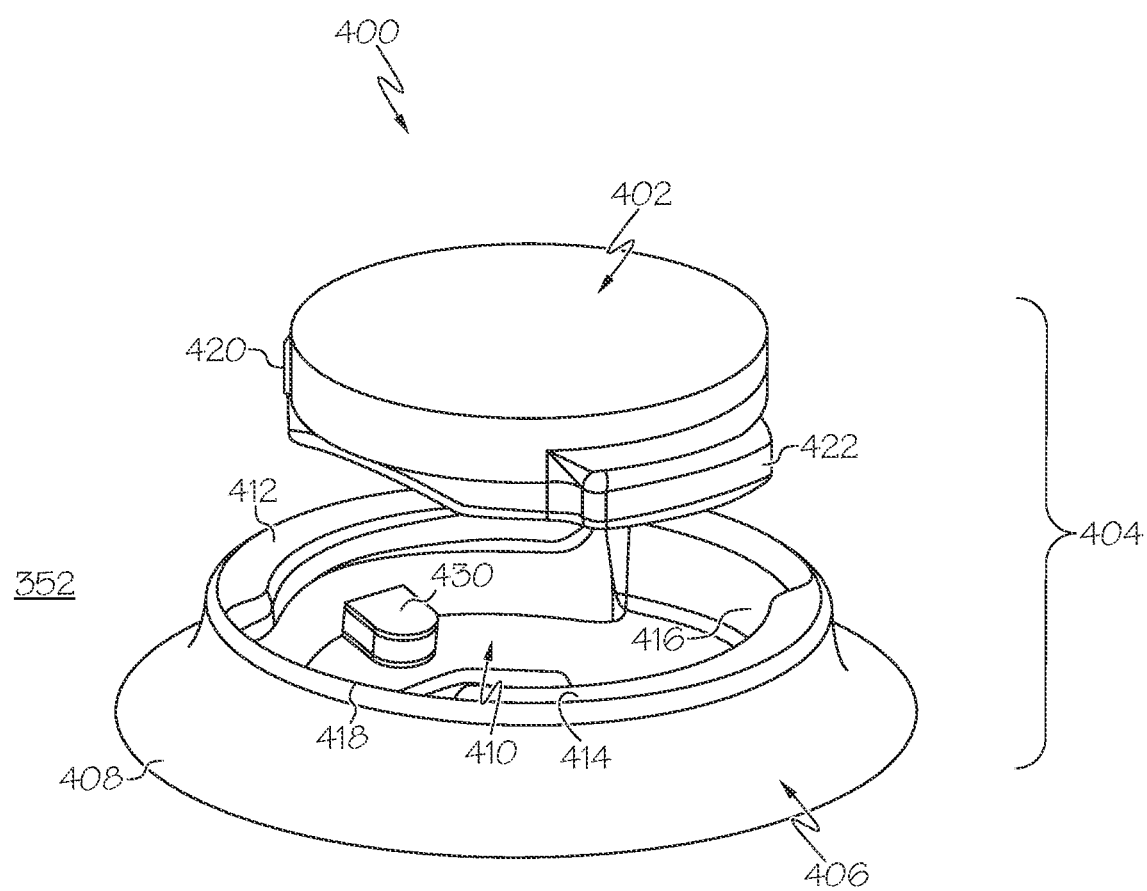
FIG. 13 is a perspective view of an alternative coupling device according to the present invention.

Turning to FIG. 13 coupling plate 352 can be modified in such a manner that bracelet engaging tab 108 can be replaced by a different coupling devices and/or coupling means. Such alternative coupling devices and/or means, include, but are not limited to, a twist-and-lock device, a releasable snap, a rare earth magnet coupling, etc. In one embodiment, as is shown in FIG. 13 coupling plate 352 can be formed to include a male coupling hub 402 that is formed on one surface of coupling plate 352. It should be noted that in FIG. 13 male coupling hub 402 is illustrated as separate from desired surface of coupling plate 352. However, in practice this is not the case and was only done here to allow for better viewing of this male-female coupling embodiment that works as the above described twist-and-lock coupling device.

As is shown in FIG. 13, male coupling hub 402 is designed to be the male portion of coupling device 404 such that hub 402 is able to couple, or engage, with female coupling receptacle 406. Female coupling receptacle 406 includes a raised collar 408 that is formed on the back surface of a cell phone case, or a portion thereof such as element 102 described above. Collar 408 defines a cavity 410 having partial radial shelves 412 and 414 and wing receiving notches 416 and 418 designed to receive appropriate wings 420 and 422 formed on opposite radial sides of male coupling hub 402. The first shelf 412 oppositely disposed from the second first shelf 414 are configured to slidably receive one of wings 420 and 422 of hub 402. Shelves 412 and 414 are configured to engage one of the wings 420 and 422 of hub 402 when hub 402 is in a locked configuration. A surface of each shelf 412 and 414 inhibits axial movement of the locking device 400 when hub 402 and coupling receptacle 406 are connected together in a locked position via rotating hub 402 and its wings 420 and 422 an appropriate radial turn such that wings 420 and 422 lock in place due to one or more stops 430 (only one is shown). Wings 420 and 422 move out of engagement with shelves 412 and 414 when hub 402 is rotated an opposite radial direction from the locked position. As can be appreciated by those of skill in the art, the locking rotation could be a clockwise rotational movement and the unlocking rotation a counter-clockwise movement, or the locking rotation could be a counter-clockwise rotational movement and the unlocking rotation a clockwise movement. In another embodiment, coupling plate 352 can be formed to include female coupling receptacle 406 and the corresponding male coupling hub 402 is then formed on the back surface a cell phone case, or a portion thereof such as element 102 described above.

Figure 14A:
FIGS. 14A and 14B are side views of a U-shaped cell phone cradle.
Figure 14B:
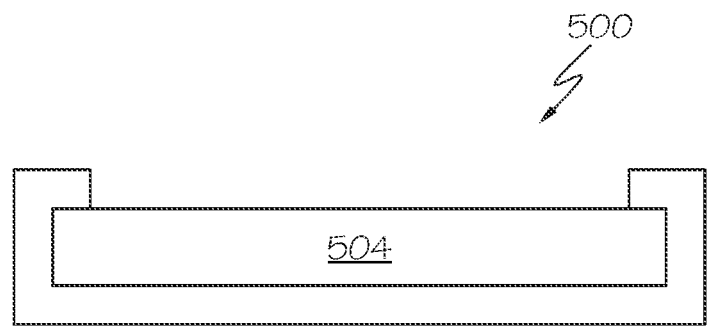
Figure 15:
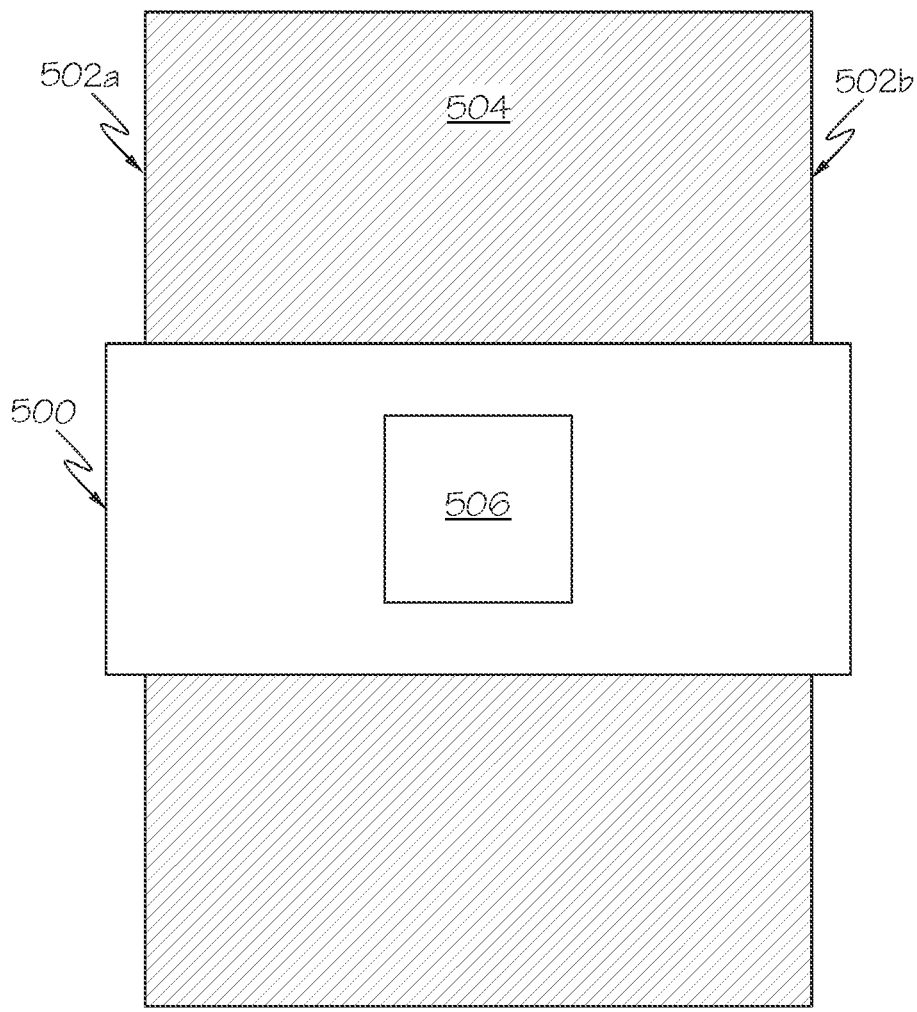
FIG. 15 is a back plan view of a cell phone having thereon the U-shaped cradle of FIGS. 14A and 14B.

In still another embodiment, rather than a complete cell phone shaped case that is designed to surround the complete perimeter of a designed cell phone, a U-shaped coupling cradle device 500 can be formed so as to engage the opposite vertical edges 502a and 502b of a cell phone 504 or any cell phone that is already placed in any desired third party cell phone case 504. FIGS. 14A, 14B and 15 illustrate such a partial cradle-shaped phone engaging device with box 506 representing any of the coupling devices described above that permit the bracelet of the present invention to engage and couple with the back side of U-shaped coupling device 500. Such a coupling can occur via the combination of coupling plate 352 and tab 108 with box 506 representing tab 108 in this embodiment. Alternatively, box 506 could represent one of male coupling hub 402 or female coupling receptacle 406 described above with the remaining portion of this coupling device being located on one surface of the present invention's bracelet coupling plate 352.

In one embodiment, the width U-shaped coupling cradle 500 is fixed given the desired cell phone to be placed therein. Alternatively, in another embodiment, the width U-shaped coupling cradle 500 could be made adjusted by any suitable method, or means, including, but not limited to, springs, set screws, pressure plates, rubber biasing bands, slidable tracks and one or more locking devices (such as a tightening screw, a locking lever, etc.) such that U-shaped cradle 500 can exert the necessary pressure on the vertical sides 502a and 502b of cell phone 504 so that cradle 500 remains stably in place.

In still another embodiment any coupling device of the present invention as represented in a non-limiting manner by box 506 and coupling plate 352 can be replaced in any embodiment described above by any suitable alternative coupling device including, but not limited to, a set of rare earth magnets designed to removable and releasably couple bracelet 350 to any desirable portion of cell phone case 100 (such as first element 102 or even cell phone case 100 in the instance where cell phone case 100 is formed from only one piece), or a metal or plastic snapping device or arrangement similar to those used on jackets and known to those of skill in the art.

In light of the above, the present invention in one embodiment is directed to a cell phone case comprising: a phone case element having front surface and a back surface, the phone case element having at least one coupling tab affixed to the back surface of the phone case element; and a bracelet element, the bracelet element having therein at least one coupling plate, the coupling plate being designed to couple to, or engage with, at least a portion of the at least one coupling tab of the phone case element, wherein the at least one coupling tab and the bracelet element's coupling plate can be coupled to, or engaged with, one another in order to removably capture only a partial portion of the bracelet element.

In another instance, the coupling tab above has a back surface and a front surface, wherein the back surface of the coupling tab has one or more raised ridges to further help secure the engagement of the coupling plate and the coupling tab so as to further secure attachment of the bracelet element to the phone case element. In one instance, the phone case element and the at least one coupling tab are integrally formed so as to be permanently affixed to one another. In another instance, the at least one coupling tab can be removably affixed to the phone case element. In still another instance, the at least one coupling tab is permanently affixed to the phone case element via any suitable glue, epoxy or adhesive tape.

In light of the above, the present invention in one embodiment is directed to a cell phone case comprising: a phone case element having front surface and a back surface, the phone case element having integrally formed therein at least one coupling tab; and a bracelet element, the bracelet element having therein at least one coupling plate, the coupling plate being designed to couple to, or engage with, at least a portion of the at least one integrally formed coupling tab of the phone case element, wherein the at least one coupling tab and the bracelet element's coupling plate can be coupled to, or engaged with, one another in order to removably capture only a partial portion of the bracelet element.

In another instance, the coupling tab has a back surface and a front surface, wherein the back surface of the coupling tab has one or more raised ridges to further help secure the engagement of the coupling plate and the coupling tab so as to further secure attachment of the bracelet element to the phone case element.

In light of the above, the present invention in one embodiment is directed to a cell phone case comprising: a phone case element having front surface and a back surface, the phone case element having a first portion of a twist-and-lock coupling hub affixed to the back surface of the phone case element; and a bracelet element, the bracelet element having therein a second portion of a twist-and-lock coupling hub, wherein the first and second portions of the twist-and-lock coupling hub are able to be twisted together to removably lock the phone case element to the bracelet element.

In one instance, the first portion of the twist-and-lock coupling hub is a male portion and the second portion of the twist-and-lock coupling hub is a female portion. In another instance, the first portion of the twist-and-lock coupling hub is a female portion and the second portion of the twist-and-lock coupling hub is a male portion. In another instance, the first portion of the twist-and-lock coupling hub is removably affixed to the back surface of the phone case element. In still another instance, the first portion of the twist-and-lock coupling hub is permanently affixed to the back surface of the phone case element via any suitable glue, epoxy or adhesive tape. In still another instance, the first portion of the twist-and-lock coupling hub is integrally formed on the back surface of the phone case element and/or the second portion of the twist-and-lock coupling hub is integrally formed on at least one portion of the bracelet element.

In another embodiment, the present invention relates to a wearable cell phone cradle comprising: U-shaped element, the U-shaped element designed to span the width of a cell phone, or a cell phone located in any cell phone case, and to removably engage a portion of each of the opposite vertical edges of the cell phone or any cell phone case, the U-shaped element having a front surface and a back surface, the back surface having at least one coupling device; and a bracelet element, the bracelet element having therein at least one coupling device, wherein U-shaped element's coupling device and the bracelet element's coupling device are able to removably engage with one another to permit the repeatable and removable coupling of the U-shaped element to the bracelet element.

In another instance, the U-shaped element's coupling device is a first portion of a twist-and-lock coupling hub and the bracelet element's coupling device is a second portion of a twist-and-lock coupling hub. In still another instance, the U-shaped element's coupling device is a coupling tab and the bracelet element's coupling device is a coupling plate. In still another instance, the U-shaped element's coupling device is a first portion of a releasable snap and the bracelet element's coupling device is a second portion of a releasable snap. In still another instance, the U-shaped element's coupling device is a first portion of a releasable magnet and the bracelet element's coupling device is a second portion of a releasable magnet.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A cell phone case comprising:
   a phone case element having a front surface and a back surface, the phone case element having at least one U-shaped coupling tab affixed via at least one end or surface to the phone case element; and
   a bracelet element, the bracelet element having therein at least one coupling plate, the coupling plate being designed to couple to, or engage with, at least a portion of the at least one U-shaped coupling tab of the phone case element,
   wherein the at least one U-shaped coupling tab has a back surface and a front surface, and
   wherein the at least one U-shaped coupling tab and the bracelet element's coupling plate can be coupled to, or engaged with, via at least one first raised U-shaped coupling ridge located on the back surface of the phone case element and at least one second raised U-shaped coupling ridge located on the back surface the at least one U-shaped coupling tab, one another in order to removably capture only a partial portion of the bracelet element.

2. The cell phone case of claim 1, wherein the at least one first raised U-shaped coupling ridge and the at least one second raised U-shaped coupling ridge form a rectangular shape that couples with, or engages with, the at least one coupling plate such that the at least one coupling plate is rectangular-shaped.

3. The cell phone case of claim 2, wherein the phone case element and the at least one coupling tab are integrally formed so as to be permanently affixed to one another.

4. The cell phone case of claim 2, wherein the at least one coupling tab is removably affixed to the phone case element.

5. The cell phone case of claim 2, wherein the at least one coupling tab is permanently affixed to the phone case element via any suitable glue, epoxy or adhesive tape.

6. The cell phone case of claim 1, wherein the cell phone case comprises two or more bracelet elements where each individual bracelet element can be interchangeably used in conjunction with the cell phone case element.

7. A cell phone case comprising:
a phone case element having a front surface and a back surface, the phone case element having integrally formed therein at least one U-shaped coupling tab; and
a bracelet element, the bracelet element having therein at least one coupling plate, the coupling plate being designed to couple to, or engage with, at least a portion of the at least one integrally formed U-shaped coupling tab of the phone case element,
wherein the at least one integrally formed U-shaped coupling tab has a back surface and a front surface,
wherein the at least one integrally formed U-shaped coupling tab and the bracelet element's coupling plate can be coupled to, or engaged with, via at least one first raised U-shaped coupling ridge located on the back surface of the phone case element and at least one second raised U-shaped coupling ridge located on the back surface the at least one U-shaped coupling tab, one another in order to removably capture only a partial portion of the bracelet element,
wherein the at least one first raised U-shaped coupling ridge is located along a portion of the perimeter of the at least one integrally formed U-shaped coupling tab such that the at least one first raised U-shaped coupling ridge resides along the perimeter of the fixed end and both adjacent sides of the at least one integrally formed U-shaped coupling tab, and
wherein the at least one second raised U-shaped coupling ridge is located as a horizontal cross-member on the back surface of the integrally formed U-shaped coupling tab.

8. The cell phone case of claim 7, wherein the at least one first raised U-shaped coupling ridge and the at least one second raised U-shaped coupling ridge form a rectangular shape that couples with, or engages with, the at least one coupling plate such that the at least one coupling plate is rectangular-shaped.

9. The cell phone case of claim 7, wherein the cell phone case comprises two or more bracelet elements where each individual bracelet element can be interchangeably used in conjunction with the cell phone case element.

10. A cell phone case comprising:
a phone case element having front surface and a back surface, the phone case element having a first portion of a circular-shaped twist-and-lock coupling hub affixed to the back surface of the phone case element; and
a bracelet element, the bracelet element having therein a second portion of a circular-shaped twist-and-lock coupling hub,
wherein the first and second portions of the circular-shaped twist-and-lock coupling hub are able to be rotationally twisted together to removably lock the phone case element to the bracelet element.

11. The cell phone case of claim 10, wherein the first portion of the circular-shaped twist-and-lock coupling hub is a male portion and the second portion of the circular-shaped twist-and-lock coupling hub is a female portion.

12. The cell phone case of claim 10, wherein the first portion of the circular-shaped twist-and-lock coupling hub is a female portion and the second portion of the circular-shaped twist-and-lock coupling hub is a male portion.

13. The cell phone case of claim 10, wherein the first portion of the circular-shaped twist-and-lock coupling hub is removably affixed to the back surface of the phone case element.

14. The cell phone case of claim 10, wherein the first portion of the circular-shaped twist-and-lock coupling hub is permanently affixed to the back surface of the phone case element via any suitable glue, epoxy or adhesive tape.

15. The cell phone case of claim 10, wherein the first portion of the circular-shaped twist-and-lock coupling hub is integrally formed on the back surface of the phone case element.

16. The cell phone case of claim 10, wherein the cell phone case comprises two or more bracelet elements where each individual bracelet element can be interchangeably used in conjunction with the cell phone case element.

17. A wearable cell phone cradle comprising:
a U-shaped element, the U-shaped element designed to span the width of a cell phone, or a cell phone located in any cell phone case, and to removably engage a portion of each of the opposite vertical edges of the cell phone or any cell phone case, the U-shaped element having a front surface and a back surface, the back surface having at least one coupling device; and
a bracelet element, the bracelet element having therein at least one coupling device,
wherein U-shaped element's coupling device and the bracelet element's coupling device are able to removably engage with one another to permit the repeatable and removable coupling of the U-shaped element to the bracelet element.

18. The wearable cell phone cradle of claim 17, wherein the U-shaped element's coupling device is a first portion of a twist-and-lock coupling hub and the bracelet element's coupling device is a second portion of a twist-and-lock coupling hub.

19. The wearable cell phone cradle of claim 17, wherein the U-shaped element's coupling device is a coupling tab and the bracelet element's coupling device is a coupling plate.

20. The wearable cell phone cradle of claim 17, wherein the U-shaped element's coupling device is a first portion of a releasable snap and the bracelet element's coupling device is a second portion of a releasable snap.

21. The wearable cell phone cradle of claim 17, wherein the U-shaped element's coupling device is a first portion of a releasable magnet and the bracelet element's coupling device is a second portion of a releasable magnet.

* * * * *